US008824834B2

(12) United States Patent
Moon et al.

(10) Patent No.: US 8,824,834 B2
(45) Date of Patent: Sep. 2, 2014

(54) ADAPTIVE SAMPLING GUIDED BY MULTILATERAL FILTERING

(75) Inventors: Bochang Moon, Daejeon (KR); Nathan A. Carr, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 206 days.

(21) Appl. No.: 13/562,595

(22) Filed: Jul. 31, 2012

(65) Prior Publication Data

US 2013/0077893 A1    Mar. 28, 2013

Related U.S. Application Data

(60) Provisional application No. 61/538,666, filed on Sep. 23, 2011.

(51) Int. Cl.
*G06K 9/32* (2006.01)
*H04N 7/12* (2006.01)
*G06T 5/00* (2006.01)

(52) U.S. Cl.
CPC .. *G06K 9/32* (2013.01); *G06T 5/001* (2013.01)
USPC ..................... 382/299; 375/240.19

(58) Field of Classification Search
USPC ......... 382/240, 254, 299; 375/240.18, 240.19
See application file for complete search history.

(56) References Cited

U.S. PATENT DOCUMENTS

| 7,184,042 | B2 | 2/2007 | Keller | |
| 7,199,795 | B2 * | 4/2007 | Christensen et al. | 345/428 |
| 7,358,971 | B2 | 4/2008 | Keller | |
| 7,768,524 | B2 | 8/2010 | Snyder et al. | |
| 7,894,531 | B1 * | 2/2011 | Cetin et al. | 375/240.19 |
| 7,952,583 | B2 | 5/2011 | Waechter et al. | |
| 8,224,107 | B2 * | 7/2012 | Gardella et al. | 382/254 |
| 8,253,754 | B2 * | 8/2012 | Snyder et al. | 345/582 |

OTHER PUBLICATIONS

Ryutarou Ohbuchi and Masaki Aono, "Quasi-Monte Carlo Rendering with Adaptive Sampling," Tokyo Research Laboratory, IBM Japan Ltd., Jun. 1996. pp. 1-14.

* cited by examiner

*Primary Examiner* — Kanjibhai Patel
(74) *Attorney, Agent, or Firm* — Wolfe-SBMC

(57) ABSTRACT

A method, system, and computer-readable storage medium are disclosed for adaptive sampling guided by multilateral filtering. A plurality of versions of a first image are generated. Each of the plurality of versions of the first image has a respective different resolution. A respective priority map is generated for each of the plurality of versions of the first image. Each respective priority map identifies a plurality of high-priority regions in a corresponding one of the plurality of versions of the first image. A second image is rendered based on the priority maps. The rendering comprises performing a ray-tracing process having a greater number of samples per pixel for the high-priority regions of the second image than for other regions of the second image.

20 Claims, 8 Drawing Sheets

ADAPTIVE SAMPLING GUIDED BY MULTILATERAL FILTERING

PRIORITY INFORMATION

This application claims benefit of priority of U.S. Provisional Application Ser. No. 61/538,666 entitled "Adaptive Sampling Guided by Multilateral Filtering" filed Sep. 23, 2011, the content of which is incorporated by reference herein in its entirety.

BACKGROUND

1. Field of the Invention

The present invention is directed to computer systems; and more particularly, it is directed to rendering of digital images.

2. Description of the Related Art

Digital images may include raster graphics, vector graphics, or a combination thereof. Raster graphics data (also referred to herein as bitmaps) may be stored and manipulated as a grid of individual picture elements called pixels. A bitmap may be characterized by its width and height in pixels and also by the number of bits per pixel. Commonly, a color bitmap defined in the RGB (red, green blue) color space may comprise between one and eight bits per pixel for each of the red, green, and blue channels. An alpha channel may be used to store additional data such as per-pixel transparency values. Vector graphics data may be stored and manipulated as one or more geometric objects built with geometric primitives. The geometric primitives (e.g., points, lines, polygons, Bézier curves, and text characters) may be based upon mathematical equations to represent parts of digital images.

Digital image processing is the process of analyzing and/or modifying digital images using a computing device, e.g., a computer system. Using specialized software programs, digital images may be manipulated and transformed in a variety of ways. For example, image rendering is the process of generating a digital image based on an image description.

Global illumination methods for rendering, such as path tracing based on Monte Carlo ray tracing, have been widely used for generating high quality images. However, such methods tend to be slow since many ray samples are required to produce high-quality rendered images. If a relatively small number of ray samples are used, the rendered images tend to show an unacceptable amount of noise. Therefore, prior approaches to such methods have carried a trade-off between speed and quality.

Adaptive sampling methods for rendering may generate a greater number of rays on important regions where global illumination methods would produce more errors (e.g., noise). Examples of adaptive sampling methods include multidimensional adaptive rendering and wavelet rendering. Such methods may identify the important regions based on a contrast metric (e.g., variance). More rays may then be allocated to these regions. In connection with these adaptive sampling methods, reconstructions may also be used as a post-processing step for generating smooth images.

Filtering methods for global illumination methods have been proposed to reduce the noise in rendered images. Examples of such filtering methods include a variant of bilateral filtering and edge-avoiding A-Trous filtering. These filtering methods have been proposed as a post-processing part of a rendering pipeline.

SUMMARY

Various embodiments of systems, methods, and computer-readable storage media for adaptive sampling guided by multilateral filtering are disclosed. A plurality of versions of a first image may be generated. Each of the plurality of versions of the first image may have a different resolution. In one embodiment, the plurality of versions of the first image may include the first image in its original resolution along with one or more downsampled versions of the first image.

A priority map may be generated for each of the plurality of versions of the first image. Each priority map may identify a plurality of high-priority regions in a corresponding version of the first image. In one embodiment, the resolution of each priority map may match the resolution of the corresponding version of the first image.

A second image may be rendered based on the priority maps. In one embodiment, the second image may be rendered based on a global priority map generated based on the priority maps. Rendering of the second image may comprise performing a ray-tracing process having a greater number of samples per pixel for the high-priority regions of the second image than for other regions of the second image. As a result of the adaptive sampling guided by multilateral filtering, the second image may be less noisy than the first image. The adaptive sampling guided by multilateral filtering may be repeated a plurality of times.

Figure 1:
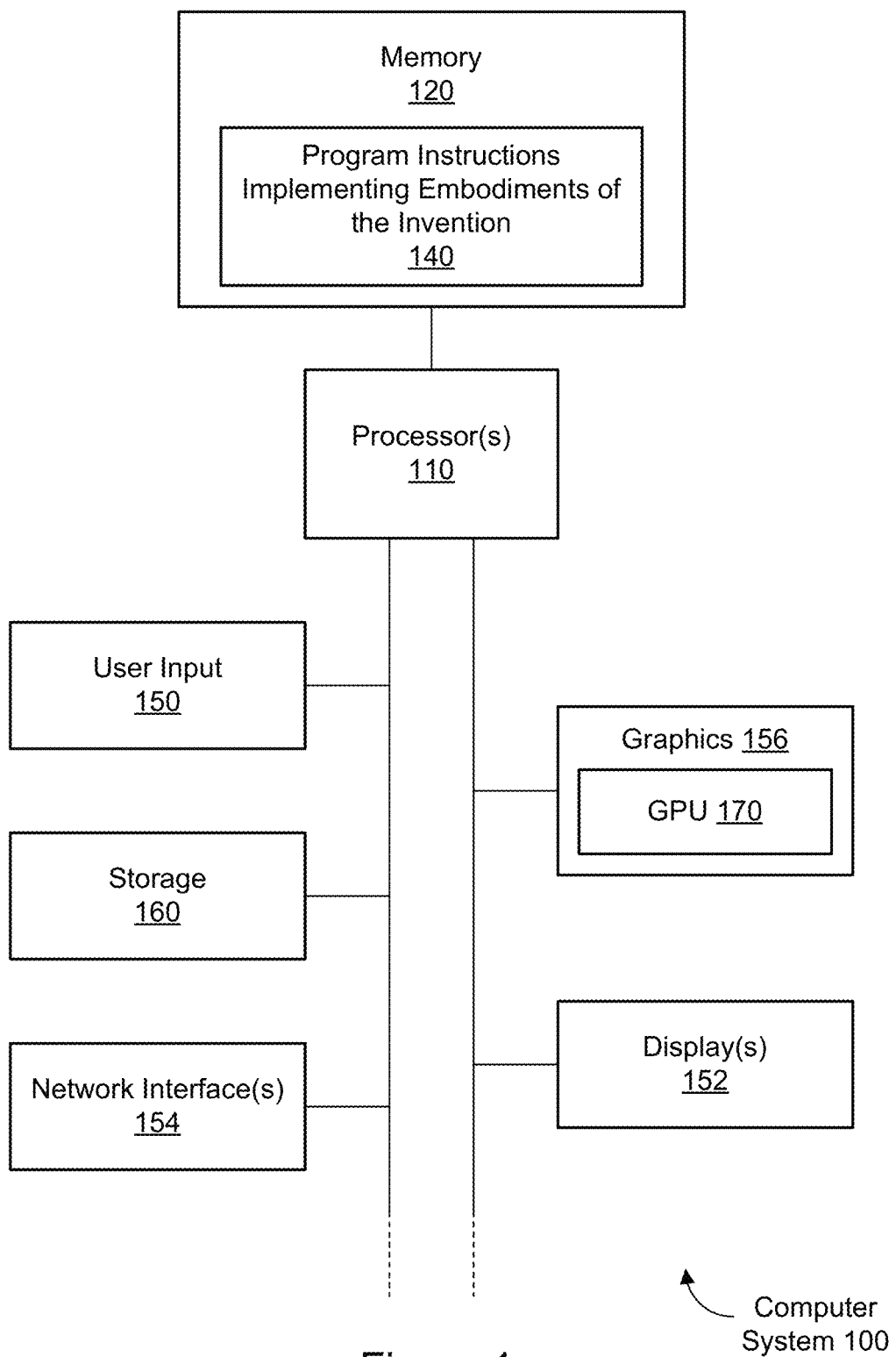
FIG. 1 is a block diagram of an example system configured to implement embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Embodiments of the systems and methods described herein may be used to perform adaptive sampling guided by multilateral filtering in the rendering of digital images. FIG. 1 is a block diagram illustrating constituent elements of a computer system 100 that is configured to implement embodiments of the systems and methods described herein. The computer system 100 may include one or more processors 110 implemented using any desired architecture or chip set, such as the SPARC™ architecture, an x86-compatible architecture from Intel Corporation or Advanced Micro Devices, or an other architecture or chipset capable of processing data. Any desired operating system(s) may be run on the computer system 100, such as various versions of Unix, Linux, Windows® from Microsoft Corporation, MacOS® from Apple Inc., or any other operating system that enables the operation of software on a hardware platform. The processor(s) 110 may be coupled to one or more of the other illustrated components, such as a memory 120, by at least one communications bus.

In one embodiment, a specialized graphics card or other graphics component 156 may be coupled to the processor(s) 110. The graphics component 156 may include a graphics processing unit (GPU) 170, which in some embodiments may be used to perform at least a portion of the techniques described below. Additionally, the computer system 100 may include one or more imaging devices 152. The one or more imaging devices 152 may include various types of raster-based imaging devices such as monitors and printers. In one embodiment, one or more display devices 152 may be coupled to the graphics component 156 for display of data provided by the graphics component 156.

In one embodiment, program instructions 140 that may be executable by the processor(s) 110 to implement aspects of the techniques described herein may be partly or fully resident within the memory 120 at the computer system 100 at any point in time. The memory 120 may be implemented using any appropriate medium such as any of various types of ROM or RAM (e.g., DRAM, SDRAM, RDRAM, SRAM, etc.), or combinations thereof. The program instructions may also be stored on a storage device 160 accessible from the processor(s) 110. Any of a variety of storage devices 160 may be used to store the program instructions 140 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage 160 may be coupled to the processor(s) 110 through one or more storage or I/O interfaces. In some embodiments, the program instructions 140 may be provided to the computer system 100 via any suitable computer-readable storage medium including the memory 120 and storage devices 160 described above.

The computer system 100 may also include one or more additional I/O interfaces, such as interfaces for one or more user input devices 150. In addition, the computer system 100 may include one or more network interfaces 154 providing access to a network. It should be noted that one or more components of the computer system 100 may be located remotely and accessed via the network. The program instructions may be implemented in various embodiments using any desired programming language, scripting language, or combination of programming languages and/or scripting languages, e.g., C, C++, C#, Java™, Perl, etc. The computer system 100 may also include numerous elements not shown in FIG. 1, as illustrated by the ellipsis.

Figure 2:
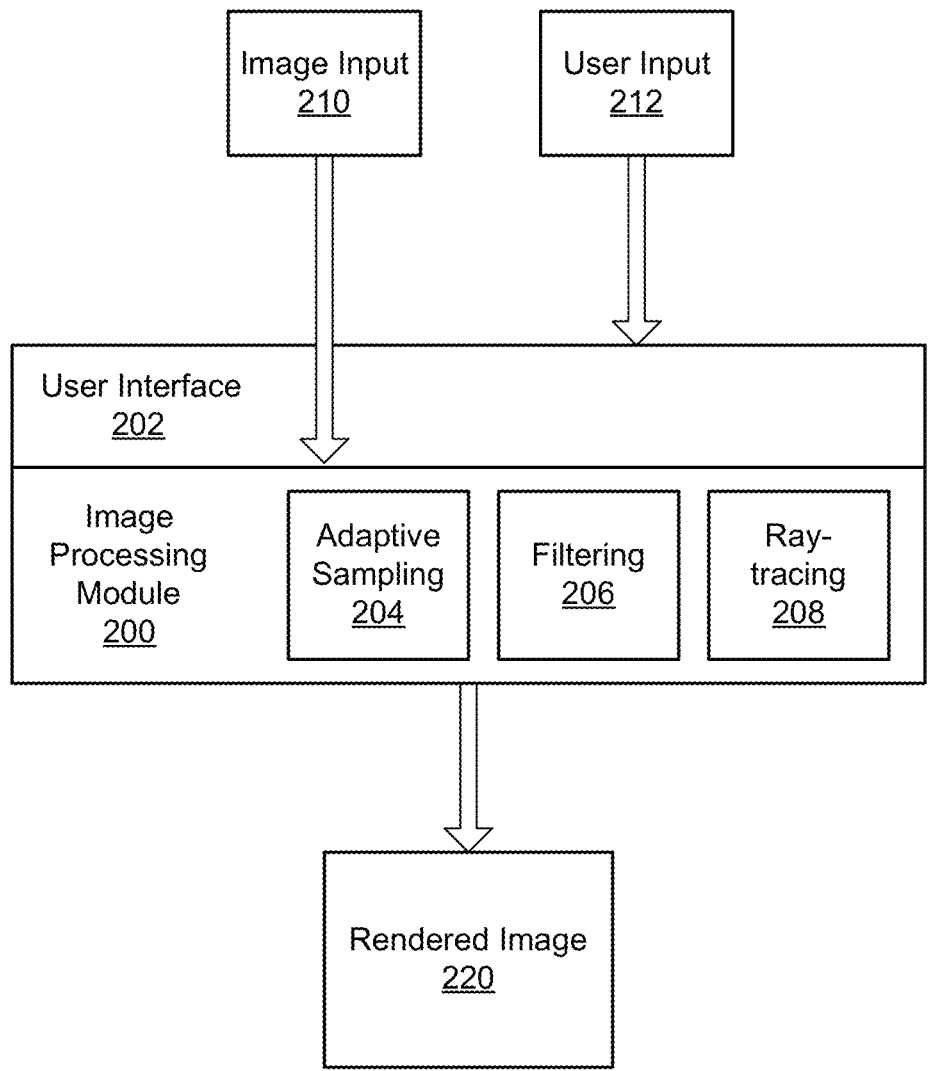
FIG. 2 illustrates an example of an image processing module configured for adaptive sampling guided by multilateral filtering, according to one embodiment.

FIG. 2 illustrates an example image processing module that may implement embodiments of methods for adaptive sampling guided by multilateral filtering. In one embodiment, module 200 may provide a user interface 202 that includes one or more user interface elements via which a user may initiate, interact with, direct, and/or control the methods performed by module 200. Module 200 may obtain image input 210. The image input 210 may comprise components of an image to be rendered and/or directions for rendering the image. For example, the image input 210 may comprise a description of an image that is usable for generating an output image in a rendering process. In various embodiments, the image input 210 may comprise two-dimensional (2D) graphical elements, three-dimensional (3D) graphical elements, or a combination thereof. In various embodiments, the image input 210 may comprise raster graphical elements, vector graphical elements, or a combination thereof.

In one embodiment, module 200 may also obtain user input 212, such as one or more instructions to perform the method for adaptive sampling guided by multilateral filtering. In various embodiments, the adaptive sampling guided by multilateral filtering may be initiated by user input, by a configuration of the image processing module 200 itself (i.e., automatically initiated), or by one or more instructions received by the image processing module 200 from another module.

As will be described below in greater detail, adaptive sampling techniques and filtering techniques may be applied to the image input 210 in rendering an output image. An adaptive sampling module 204 may be used to perform the adaptive sampling techniques, and a filtering module 206 may be used to perform the filtering techniques. The adaptive sampling module 204 and filtering module 206 may be used with a ray-tracing module 208. In various embodiments, any suitable ray-tracing module 208 may be used. Using the samples produced by the ray-tracing module 208, initial versions of the image may be analyzed using the adaptive sampling module 204 and filtering module 206 for further iterations using the ray-tracing module 208. In one embodiment, the process performed by the adaptive sampling module 204 may be performed automatically and/or programmatically. In one embodiment, the process performed by the filtering module 206 may be performed automatically and/or programmatically. In one embodiment, the process performed by the ray-tracing module 208 may be performed automatically and/or programmatically. The module 200 may produce a final rendered image 220 as output.

Image processing module 200 may be implemented as or in a stand-alone application or as a module of or plug-in for an image processing and/or presentation application. Examples of types of applications in which embodiments of module 200 may be implemented may include, but are not limited to, image editing, processing, and/or presentation applications, as well as applications in security or defense, educational, scientific, medical, publishing, digital photography, digital films, games, animation, marketing, and/or other applications in which digital video image editing or presentation may be performed, e.g., where operations are to be directed to different layers of images. Specific examples of applications in which embodiments may be implemented include, but are not limited to, Adobe® Photoshop® and Adobe® Illustrator®. In addition to generating output image sequence 220, module 200 may be used to display, manipulate, modify, and/or store the output images, for example to a memory medium such as a storage device or storage medium.

A multilateral filtering process may be used to identify important regions for rendering an image using a ray-tracing process. Any suitable ray-tracing process may be used. The ray-tracing process may include a sampling process associated with an integral to be evaluated to determine the color at each pixel. As more point samples are taken under the integral, and more resulting images are blended together, a better estimate may be produced. Each ray is associated with a computational expense, and many rays may be cast for a typical image. Accordingly, more rays may be allocated or guided into particular regions for faster convergence into the ground truth of the image. Using the adaptive sampling method described herein, the ray budget may be focused on regions of an image having a higher amount of error. The regions having a higher amount of error may be regions where a reconstruction fails, such as high-frequency edges. Post-processing techniques may also be used in performing the adapting sampling guided by multilateral filtering.

Figure 3:
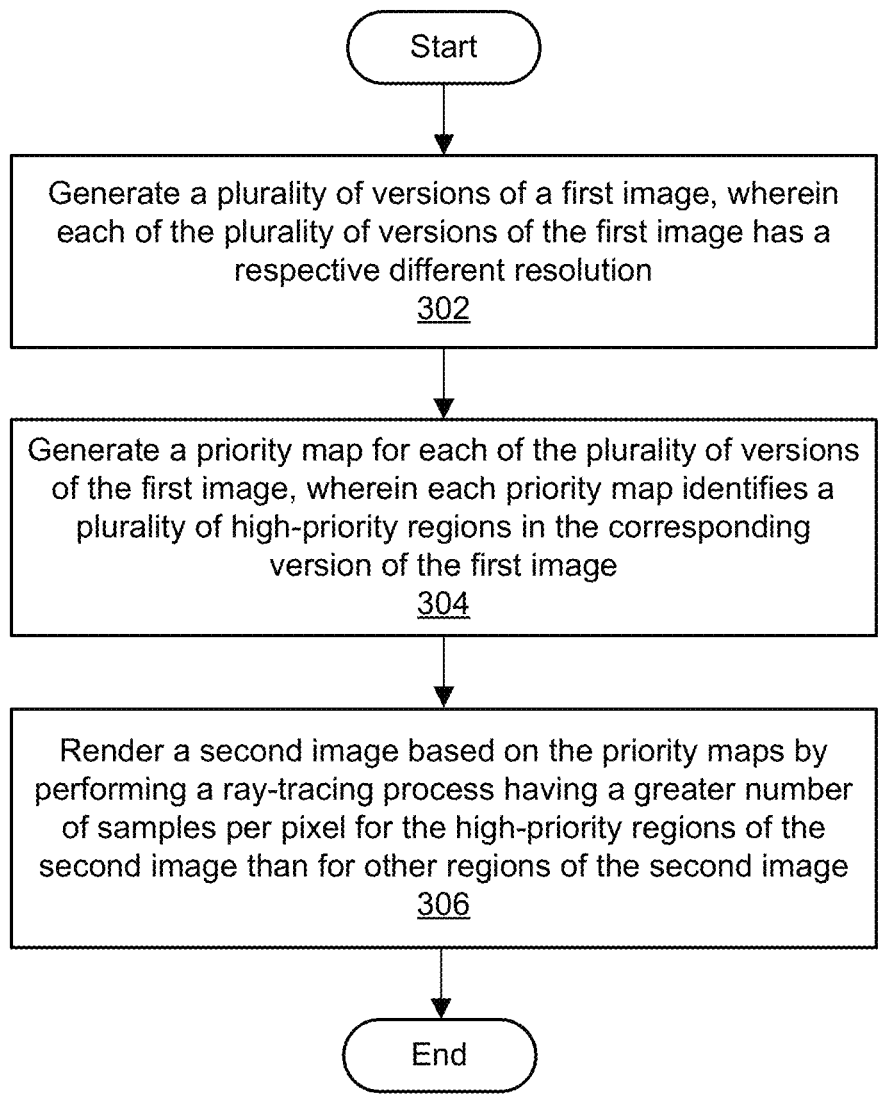
FIG. 3 is a flowchart illustrating a method for adaptive sampling guided by multilateral filtering, according to one embodiment.

FIG. 3 is a flowchart illustrating a method for adaptive sampling guided by multilateral filtering, according to one embodiment. The method shown in FIG. 3 may be used in conjunction with embodiments of the computer system shown in FIG. 1, among other devices. In various embodiments, some of the method elements shown may be performed concurrently, in a different order than shown, or may be omitted. Additional method elements may also be performed as desired. Any of the method elements described may be performed automatically (i.e., without user intervention). As shown, this method may operate as follows.

As shown in block 302, a plurality of versions of a first image may be generated. Each of the plurality of versions of the first image may have a different resolution. In one embodiment, the plurality of versions of the first image may include the first image in its original resolution along with one or more downsampled versions of the first image.

As shown in block 304, a priority map may be generated for each of the plurality of versions of the first image. Each priority map may identify a plurality of high-priority regions in a corresponding version of the first image. In one embodiment, the resolution of each priority map may match the resolution of the corresponding version of the first image.

As shown in block 306, a second image may be rendered based on the priority maps. In one embodiment, the second image may be rendered based on a global priority map generated based on the priority maps. Rendering of the second image may comprise performing a ray-tracing process having a greater number of samples per pixel for the high-priority regions of the second image than for other regions of the second image. As a result of the adaptive sampling guided by multilateral filtering, the second image may be less noisy than the first image.

Figure 4A:
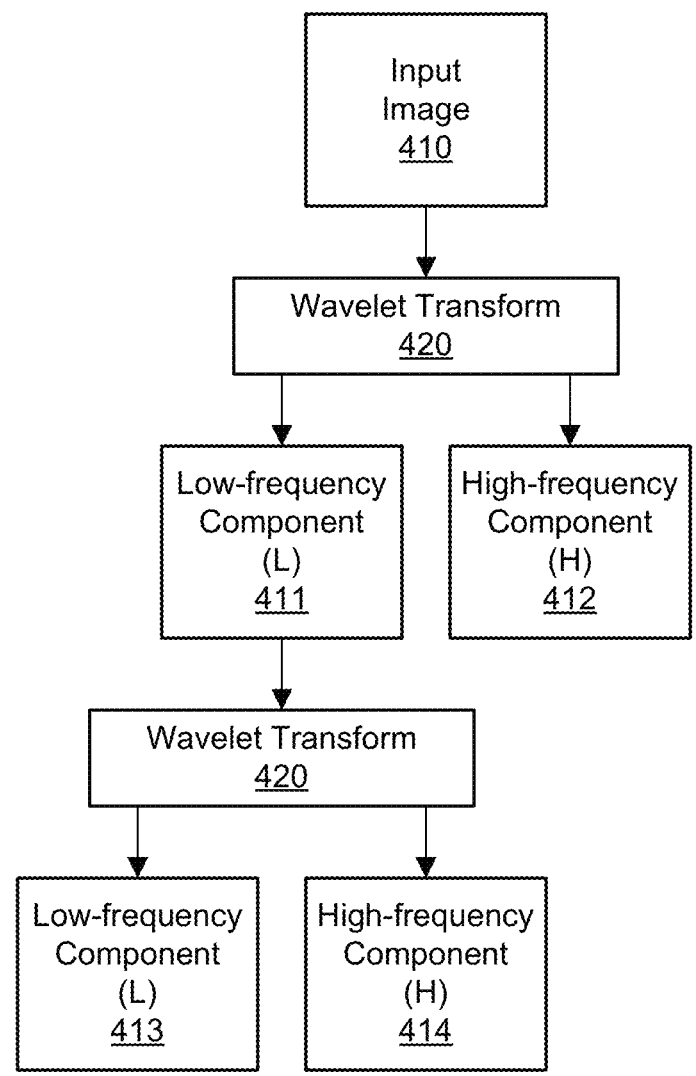
FIGS. 4A and 4B illustrate a process for adaptive sampling guided by multilateral filtering, according to one embodiment.
Figure 4B:
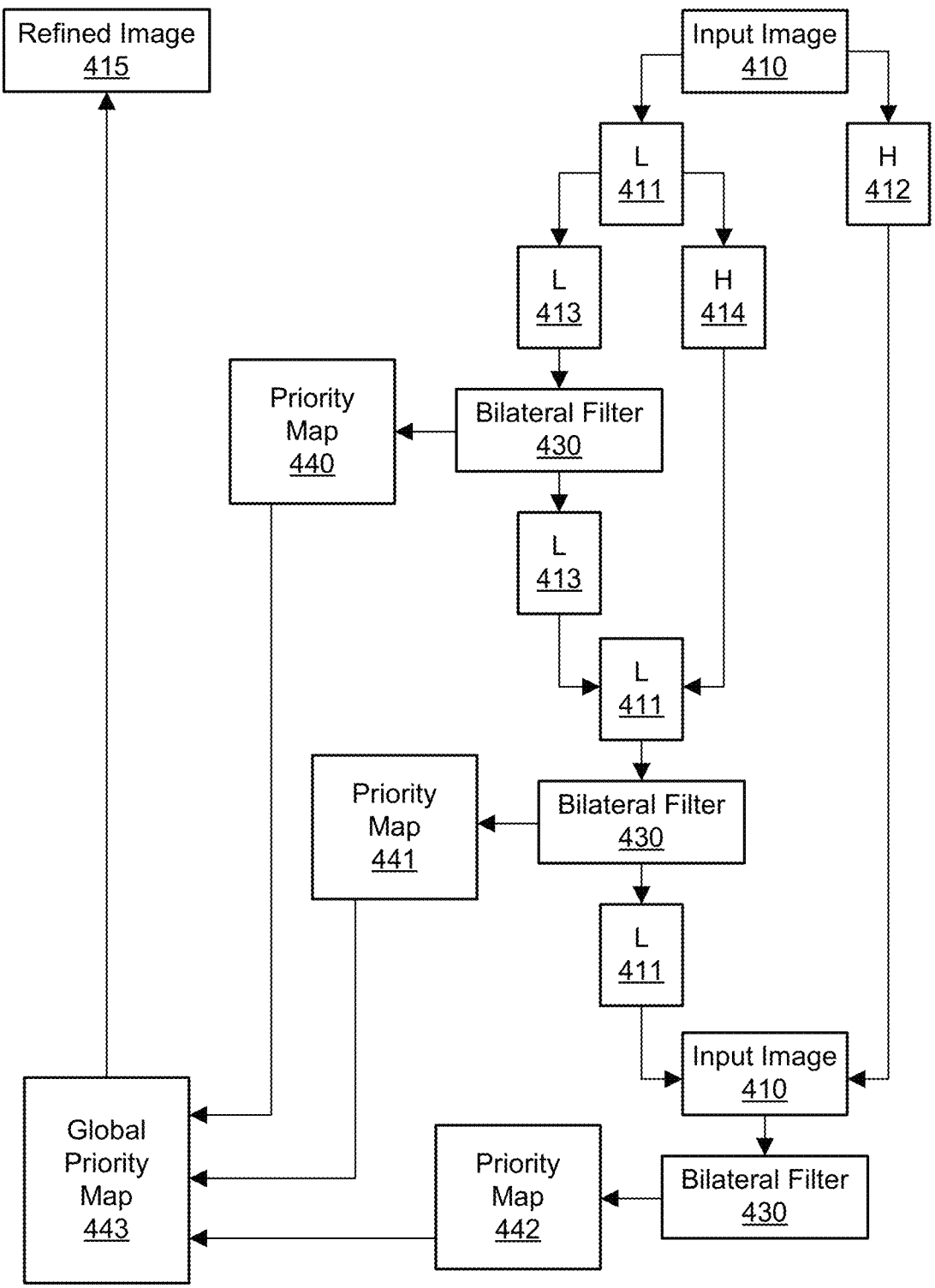

FIGS. 4A and 4B illustrate a process for adaptive sampling guided by multilateral filtering, according to one embodiment. Using the ray-tracing module 208, an input rendered image 410 may be generated based on image input 210. The input rendered image 410 may be processed using adaptive sampling and filtering techniques to produce a resulting refined image 415. The refined image 415 may in turn be processed using another iteration of the adaptive sampling and filtering techniques to produce yet another resulting image. In this manner, the noise in the rendered image may be reduced using iterations of the rendering process shown in FIGS. 4A and 4B. In various embodiments, the iteration of the rendering process may proceed until a suitable condition is met. The suitable condition may include, for example, a low-noise threshold, a predetermined number of iterations, a user instruction to terminate the process or an absence of a user instruction to continue, etc. In one embodiment, each iteration may produce a smoother image than the previous iteration using progressive rendering.

As shown in FIG. 4A, the input rendered image 410 may be decomposed by a discrete wavelet transform 420 into a low-frequency component 411 and high-frequency component 412. In one embodiment, the discrete wavelet transform 420 may separate the input image 410 into four component images, including a downsampled or low-frequency (L) version of the image and three high-frequency (H) versions of the image (e.g., LH, HL, and HH components). The low-frequency version 411 of the image may be a lower-resolution version of the image, e.g., an image having half the height and half the width of the original image. The high-frequency component 412 may include three high-frequency images (denoted as LH, HL, and HH) which respectively encode the horizontal edges, the vertical edges, and the diagonal edges of the original image. Each of the three high-frequency images may also be half the height and half the width of the original image. In one embodiment, the low-frequency component 411 and the high-frequency component 412 may collectively include all the information from the original image 410. As shown in FIG. 4A, the low-frequency component 411 may be decomposed again by a discrete wavelet transform 420 into another low-frequency component (L) 413 and another high-frequency component (H) 414.

As shown in FIG. 4B, in a reconstruction stage, a bilateral filtering process may be applied to the low-frequency components to remove noise. In one embodiment, a bilateral filter 430 may use a weighting function for each pixel to blend the pixel with its neighbors within a particular radius, based on a similarity between the pixel and each neighboring pixel. A pixel that is quite different from its neighbors may not be blended with its neighbors and may be assigned a high self-weight. In this manner, the bilateral filter 430 may preserve edges. Conversely, a pixel that is quite similar to its neighbors may be smoothly blended with its neighbors and assigned a low self-weight. In other words, the self-weight assigned to a pixel may vary with the similarity of the pixel to its neighboring pixels. When the bilateral filtering process is applied, a priority map 440, 441, or 442 may be generated for adaptive sampling. The priority in the priority map may be based on the self-weights of the pixels. Each priority map 440, 441, and 442 may indicate important regions where more rays are to be cast in the next iteration of the rendering process. A pixel with a relatively high self-weight may have a relatively high priority in the priority map, and a pixel with a relatively low self-weight may have a relatively low priority in the priority map.

The bilateral filter 430 may be applied to multiple resolutions of the image. The application of the bilateral filter 430 to multiple levels of an image is referred to herein as multilateral filtering. The multilateral filtering process may decompose an input image into low and high frequency images based on a discrete wavelet transform 420. As illustrated in FIG. 4A, the discrete wavelet transform 420 may be applied to the first low-frequency (i.e., downsampled) component 411 to produce a second low-frequency component 413 (i.e., a further downsampled image) and a second high-frequency component 414 (i.e., three high-frequency images respectively encoding the horizontal edges, the vertical edges, and the diagonal edges of the first downsampled image). As illustrated in FIG. 4B, after applying the bilateral filter 430 to the second downsampled image 413 to produce a first priority map 440, the previous wavelet transform may be undone by combining the second low-frequency component 413 with the second high-frequency component 414, thereby regenerating the first low-frequency component 411. The bilateral filter 430 may be applied to the regenerated first low-frequency component 411 to produce a second priority map 441. After applying the bilateral filter 430 to the first downsampled image 411 to produce the second priority map 441, the previous wavelet transform may be undone by combining the first low-frequency component 411 with the first high-frequency component 412, thereby regenerating the original input image 410. The bilateral filter 430 may be applied to the regenerated original input image 410 to produce a third priority map 443.

The bilateral filtering process may be applied for each low frequency image, as shown in FIG. 4B. In one embodiment, the size of the window associated with the bilateral filter may be decreased with later iterations due to the expectation that the later images will be less noisy than the earlier images. For a pixel p, the filtered value $f(I_p)$ may be computed as follows, where $\Omega$ denotes neighboring pixels within an n by n window (associated with the bilateral filter) centered at the pixel p, $I_i$ is a color value of pixel i in the image I, and $\sigma$ is a filtering parameter which controls a blurring factor:

$$f(I_p) := \frac{\sum_{i \in \Omega} e^{\frac{|I_p - I_i|}{2\sigma^2}} I_i}{\sum_{i \in \Omega} e^{\frac{|I_p - I_i|}{2\sigma^2}}}. \quad (1)$$

When this filtering process is applied, a priority map k may be generated for the adaptive sampling process. The priority map may be based on the self-weights of pixels in the filtered image along with a variance term. The variance may be computed for each pixel produced by the ray-tracing module. Any suitable estimation of variance may be used. The variance may be based on multiple samples in the ray-tracing process. For example, one estimation of variance may include the absolute value of the brightest intensity of a ray through the pixel minus the lowest intensity of a ray cast through the pixel. In some cases, a relatively smooth region may have a high variance in the ray-tracing process while the pixels in the region have low self-weights. A low variance may also be associated with a high self-weight, e.g., for a low number of ray-tracing samples. In one embodiment, if a pixel has a lower variance than a neighboring pixel, the variance of the neighboring pixel may be assigned to the pixel. In this manner, the variance estimates may be made more conservative to mitigate the likelihood of encountering low variance along with high self-weight.

In one embodiment, the priority k(p) of the pixel p may be defined as follows as a multiplication of two terms, where $\text{var}(I_p)$ denotes a variance of a color $I_p$ at pixel p, and $w_p$ is a weight value (i.e., a self-weight) of the center pixel p:

$$k(p) := w_p * \text{var}(I_p) \quad (2)$$

$$k(p) := \frac{e^{\frac{|I_p - I_p|}{2\sigma^2}}}{\sum_{i \in \Omega} e^{\frac{|I_p - I_i|}{2\sigma^2}}} \text{var}(I_p) \quad (3)$$

$$k(p) := \frac{1}{\sum_{i \in \Omega} e^{\frac{|I_p - I_i|}{2\sigma^2}}} \text{var}(I_p). \quad (4)$$

If a filtering method finds many similar pixels based on the Euclidean distance $|I_p - I_i|$ between neighboring pixels i and a center pixel p, then the self-weight $w_p$ is typically low. In this case, the priority of the pixel p is also low since the filtering can be successful when there are many similar pixels. However, if the filtering cannot find similar pixels, then the self-weight $w_p$ is high. More rays may be directed to those high-variance pixels in the next iteration, so the priority is also high in the priority map.

When the bilateral filtering process is applied for the low frequency image at each scale, a priority map may be generated based on the mentioned function k(p). As shown in FIG. 4B, the multiple priority maps 440, 441, and 442 may then be combined into a global priority map 443 (also referred to herein as a master key map) using a simple operation (e.g., addition). In one embodiment, the lowest resolution priority map may be upsampled to twice its height and width and combined with the next highest resolution priority map (i.e., having the same resolution as the upsampled lowest resolution priority map) using the addition operation. The result of the combination may again be upsampled to twice its height and width and combined with the next highest resolution priority map (i.e., having the same resolution as the upsampled combined priority map) using the addition operation. In this manner, the various individual priority maps 440, 441, and 442 may be converted to the resolution of the original input image while being added together to generate the global priority map 443. In one embodiment, an inverse of the wavelet transform 420 may be used to combine the multiple priority maps. The wavelet transform reconstruction may increase the resolution of the lower-resolution priority maps to a uniform size while losing the high-frequency information. In one embodiment, the values taken from the individual priority maps 440, 441, and 442 may be divided by the number of individual priority maps (e.g., three) to bound the values in the global priority map 443 between zero and one.

It may then be determined whether more rays are required for each pixel based on the global priority map 443. For instance, if the priority value of pixel p is relatively high in the global priority map 443, then the priority for casting rays at that pixel is also relatively high. Likewise, if the priority value of pixel p is relatively low, then the priority for casting rays at that pixel is also relatively low. Using the global priority map 443, another iteration of the rendering process may be performed again as previously described, e.g., using the ray-tracing module 208 to produce a refined image 415 having less noise than the original input image 410. The rays cast in the next iteration of the rendering process may be proportional to the values in the global priority map 443. The refined image 415 produced using the global priority map 443 may be analyzed again using the techniques for multilateral filtering as illustrated in FIGS. 4A and 4B. In this manners, multiple iterations of the adaptive sampling guided by multilateral filtering may be performed.

Figure 5A:
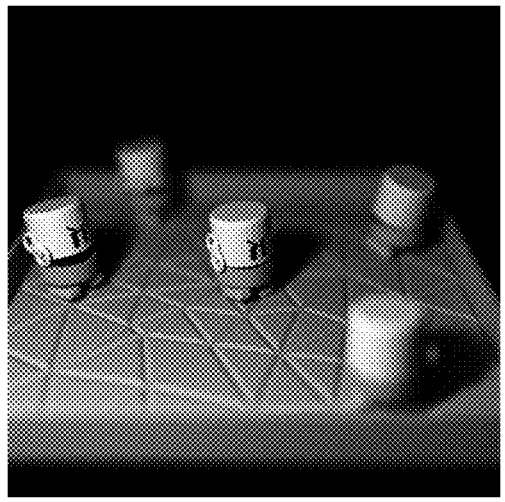
FIGS. 5A, 5B, 5C, and 5D illustrate comparative examples of images produced using various rendering techniques, according to one embodiment.
Figure 5B:
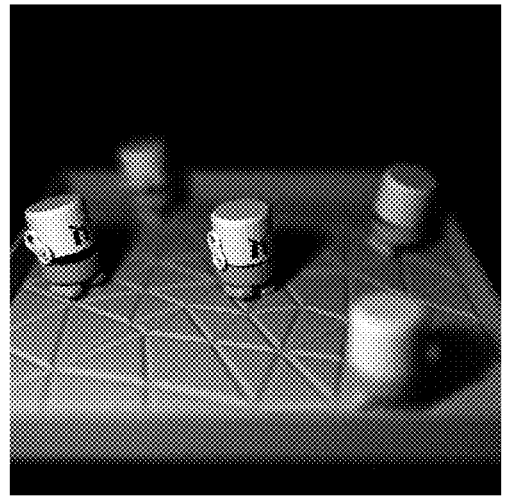
Figure 5C:
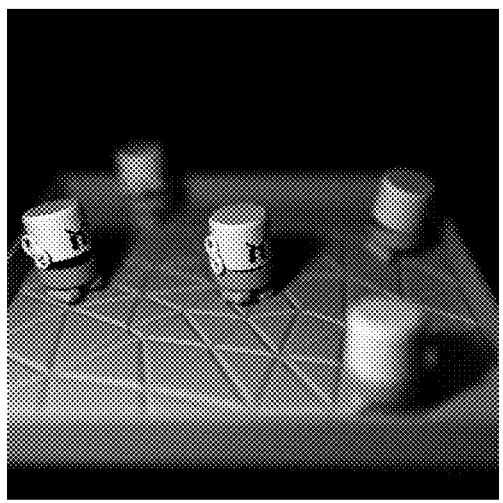
Figure 5D:
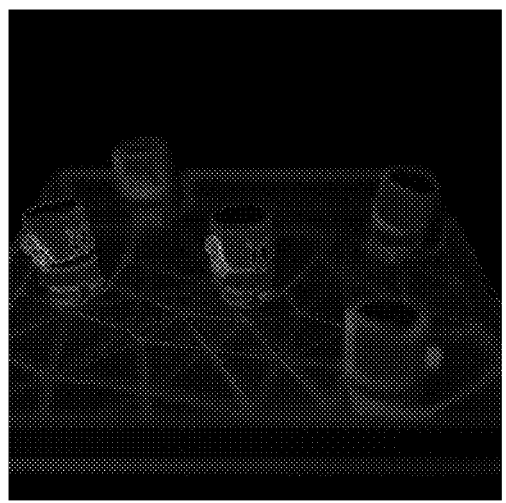

The systems and methods described herein may produce more visually pleasing rendered images than prior approaches, as shown in the examples of FIGS. 5A, 5B, 5C, 6A, 6B, and 6C. FIGS. 5A, 5B, 5C, and 5D illustrate comparative examples of images produced using various rendering techniques, according to one embodiment. The images shown in FIGS. 5A, 5B, and 5C have been generated with 64 ray samples per pixel (and originally with a 1024 by 1024 image resolution). FIG. 5A illustrates an image rendered using a uniform sampling technique in which the same number of rays are cast for every pixel. In FIG. 5A, parts of the image that are out of focus are noisy, and the edges of cast shadows are noisy. FIG. 5B illustrates an image rendered using a variance based adaptive sampling technique which places more ray samples on high variance pixels. FIG. 5C illustrates an image rendered using a method for adaptive sampling guided by multilateral filtering as described herein. FIG. 5D illustrates a sampling count for the image shown in FIG. 5C, where the high intensity indicates a relatively large number of samples, and the low intensity indicates a relatively small number of samples. The sampling count shown in FIG. 5D may be based on the global priority map generated in the previous iteration of the ray-tracing process.

Figure 6A:
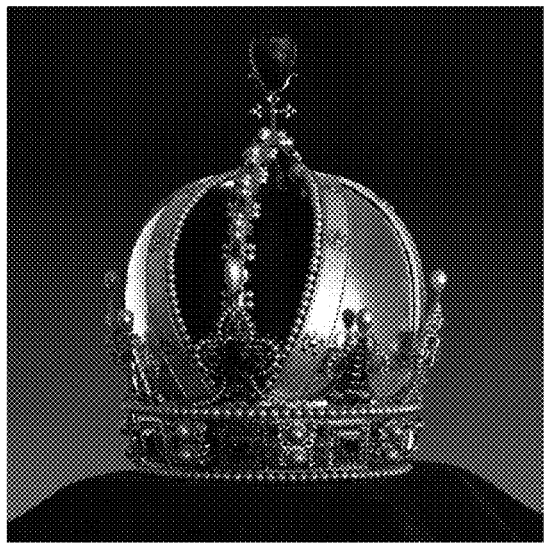
FIGS. 6A, 6B, 6C, and 6D illustrate comparative examples of images produced using various rendering techniques, according to one embodiment.
Figure 6B:
Figure 6C:
Figure 6D:
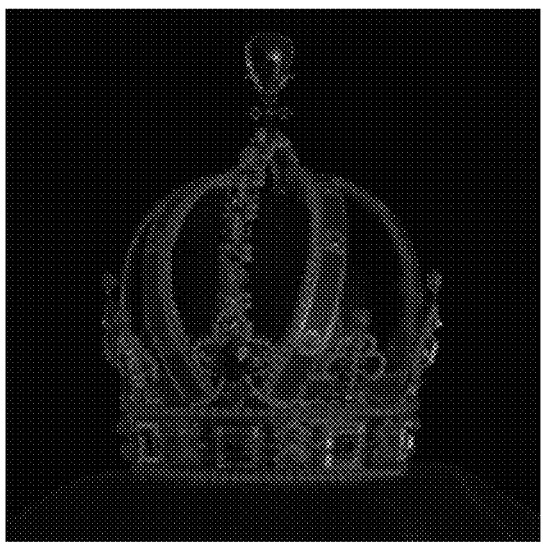

FIGS. 6A, 6B, 6C, and 6D illustrate comparative examples of images produced using various rendering techniques, according to one embodiment. The images shown in FIGS. 6A, 6B, and 6C have been generated with 64 ray samples per pixel (and originally with a 1024 by 1024 image resolution). FIG. 6A illustrates an image rendered using a uniform sampling technique in which the same number of rays are cast for every pixel. FIG. 6B illustrates an image rendered using a variance based adaptive sampling technique which places more ray samples on high variance pixels. FIG. 6C illustrates an image rendered using a method for adaptive sampling guided by multilateral filtering as described herein. FIG. 6D illustrates a sampling count for the image shown in FIG. 6C, where the high intensity indicates a relatively large number of samples over the low intensity, and the low intensity indicates a relatively small number of samples. The sampling count shown in FIG. 6D may be based on the global priority map generated in the previous iteration of the ray-tracing process.

In the images produced by the method for adaptive sampling guided by multilateral filtering, ray samples are placed on regions (e.g., edges) where the filtering can fail and not on regions (e.g., smooth regions) where it encounters success. As illustrated in FIGS. 5C and 6C, the method for adaptive sampling guided by multilateral filtering produces visually pleasing images where noise is reduced while features are preserved.

Figure 7A:
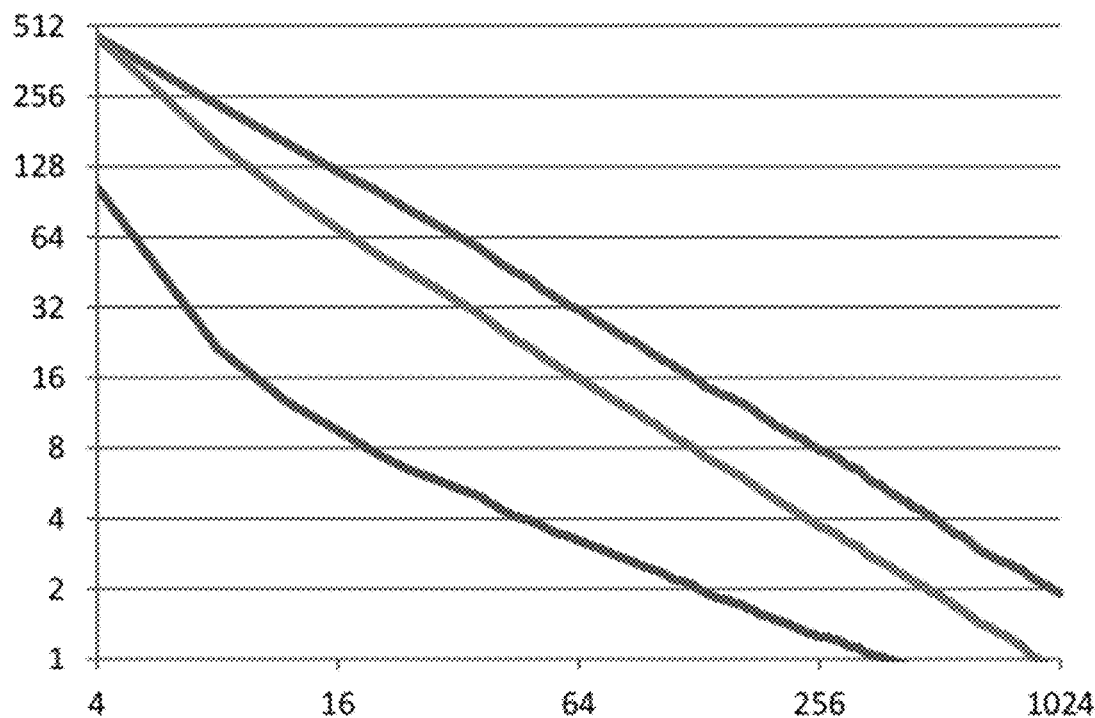
FIGS. 7A and 7B illustrate graphs of errors for the rendering of images shown in FIGS. 5A, 5B, 5C, 6A, 6B, and 6C, according to one embodiment.
Figure 7B:
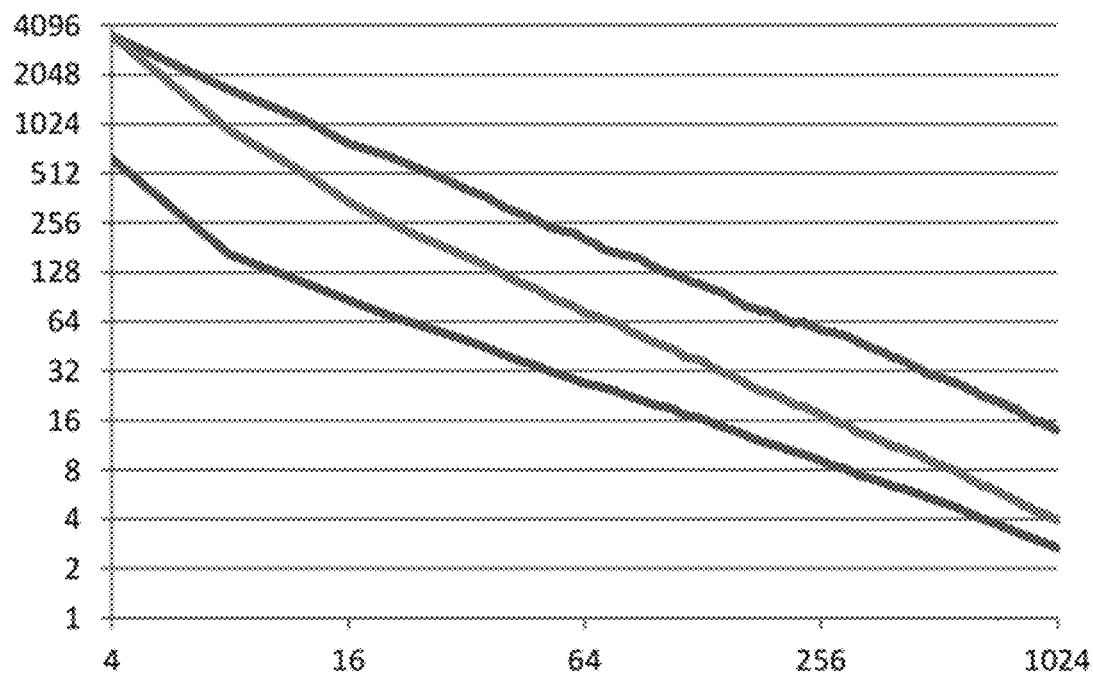

The systems and methods described herein may reduce a quantitative error in a faster manner, as shown in FIGS. 7A and 7B. FIG. 7A illustrates a graph of errors for the rendering of the images shown in FIGS. 5A, 5B, and 5C, according to one embodiment. FIG. 7B illustrates a graph of errors for the rendering of the images shown in FIGS. 6A, 6B, and 6C, according to one embodiment. In both FIGS. 7A and 7B, the lowest line shows the error associated with the technique described herein for adaptive sampling guided by multilateral filtering, the middle line shows the error associated with a technique for variance-based adaptive sampling, and the top line shows the error associated with a technique for uniform sampling. The log scaled x axis denotes the average number of rays cast per pixel, and the log scaled y axis denotes the MSE (mean square error). For result images ($I_p$) generated by each method, a quantitative error $$MSE = \sum_p (I_p - u_p)^2$$

was computed based on a ground truth image $u_p$ that was generated using 16,000 ray samples. As indicated in FIGS. 7A and 7B, the method for adaptive sampling guided by multilateral filtering as described herein requires fewer samples to achieve the same error as other ray-tracing techniques.

Although the embodiments above have been described in detail, numerous variations and modifications will become apparent to those skilled in the art once the above disclosure is fully appreciated. It is intended that the following claims be interpreted to embrace all such variations and modifications.

What is claimed is:

1. A computer-implemented method, comprising:
   generating a plurality of versions of a first image, each of the plurality of versions of the first image has a respective different resolution;
   generating a respective priority map for each of the plurality of versions of the first image, each respective priority map identifies a plurality of high-priority regions in a corresponding one of the plurality of versions of the first image; and
   rendering a second image based on the priority maps, comprising performing a ray-tracing process having a greater number of samples per pixel for the high-priority regions of the second image than for other regions of the second image.

2. The method as recited in claim 1, further comprising:
   combining each of the priority maps into a global priority map, wherein the global priority map identifies a plurality of high-priority regions in the first image;

wherein rendering the second image based on the priority maps comprises rendering the second image based on the global priority map.

3. The method as recited in claim 2, wherein each respective priority map has a respective resolution of the corresponding one of the plurality of versions of the first image, and wherein the global priority map has a same resolution as the first image.

4. The method as recited m claim 1, wherein generating the plurality of versions of the first image comprises:
using a discrete wavelet transform to decompose the first image into a low-frequency component and a high-frequency component, wherein the low-frequency component comprises a downsampled version of the first image.

5. The method as recited in claim 1, wherein generating the respective priority map for each of the plurality of versions of the first image comprises:
applying a bilateral filter to each of the plurality of versions of the first image.

6. The method as recited in claim 1, further comprising:
generating a plurality of versions of the second image, wherein each of the plurality of versions of the second image has a respective different resolution;
generating a respective priority map for each of the plurality of versions of the second image, wherein each respective priority map identifies a plurality of high-priority regions in a corresponding one of the plurality of versions of the second image; and
rendering a third image based on the priority maps for each of the plurality of versions of the second image, comprising performing a ray-tracing process having a greater number of samples per pixel for the high-priority regions of the third image than for other regions of the third image.

7. The method as recited in claim 1, wherein the second image is reduced in noise compared to the first image.

8. A system, comprising:
at least one processor; and
a memory coupled to the at least one processor, the memory stores program instructions, and the program instructions are executable by the at least one processor to perform operations comprising:
generating a plurality of versions of a first image, wherein each of the plurality of versions of the first image has a respective different resolution;
generating a respective priority map for each of the plurality of versions of the first image, wherein each respective priority map identifies a plurality of high-priority regions in a corresponding one of the plurality of versions of the first image; and
rending a second image based on the priority maps, wherein the program instructions are executable by the at least one processor to perform a ray-tracing process having a greater number of samples per pixel for the high-priority regions of the second image than for other regions of the second image.

9. The system as recited in claim 8, wherein the program instructions are executable by the at least one processor to:
combine each of the priority maps into a global priority map, wherein the global priority map identifies a plurality of high-priority regions in the first image;
wherein, in rendering the second image based on the priority maps, the program instructions are executable by the at least one processor to render the second image based on the global priority map.

10. The system as recited in claim 9, wherein each respective priority map has a respective resolution of the corresponding one of the plurality of versions of the first image, and wherein the global priority map has a same resolution as the first image.

11. The system as recited in claim 8, wherein, in generating the plurality of versions of the first image, the program instructions are executable by the at least one processor to:
use a discrete wavelet transform to decompose the first image into a low-frequency component and a high-frequency component, wherein the low-frequency component comprises a downsampled version of the first image.

12. The system as recited in claim 8, wherein, in generating the respective priority map for each of the plurality of versions of the first image, the program instructions are executable by the at least one processor to:
apply a bilateral filter to each of the plurality of versions of the first image.

13. The system as recited in claim 8, wherein the program instructions are executable by the at least one processor to:
generate a plurality of versions of the second image, wherein each of the plurality of versions of the second image has a respective different resolution;
generate a respective priority map for each of the plurality of versions of the second image, wherein each respective priority map identifies a plurality of high-priority regions in a corresponding one of the plurality of versions of the second image; and
render a third image based on the priority maps for each of the plurality of versions of the second image, wherein the program instructions are executable by the at least one processor to perform a ray-tracing process having a greater number of samples per pixel for the high-priority regions of the third image than for other regions of the third image.

14. The system as recited in claim 8, wherein the second image is reduced in noise compared to the first image.

15. A non-transitory computer-readable storage medium storing program instructions computer-executable to perform operations comprising:
generating a plurality of versions of a first image, each of the plurality of versions of the first image has a respective different resolution;
generating a respective priority map for each of the plurality of versions of the first image, each respective priority map identifies a plurality of high-priority regions in a corresponding one of the plurality of versions of the first image; and
rendering a second image based on the priority maps, comprising performing a ray-tracing process having a greater number of samples per pixel for the high-priority regions of the second image than for other regions of the second image.

16. The computer-readable storage medium as recited m claim 15, further comprising:
combining each of the priority maps into a global priority map, wherein the global priority map identifies a plurality of high-priority regions in the first image;
wherein rendering the second image based on the priority maps comprises rendering the second image based on the global priority map.

17. The computer-readable storage medium as recited in claim 16, wherein each respective priority map has a respective resolution of the corresponding one of the plurality of versions of the first image, and wherein the global priority map has a same resolution as the first image.

18. The computer-readable storage medium as recited in claim 15, wherein generating the plurality of versions of the first image comprises:
- using a discrete wavelet transform to decompose the first image into a low-frequency component and a high-frequency component, wherein the low-frequency component comprises a downsampled version of the first image.

19. The computer-readable storage medium as recited in claim 15, wherein generating the respective priority map for each of the plurality of versions of the first image comprises:
- applying a bilateral filter to each of the plurality of versions of the first image.

20. The computer-readable storage medium as recited in claim 15, further comprising:
- generating a plurality of versions of the second image, wherein each of the plurality of versions of the second image has a respective different resolution;
- generating a respective priority map for each of the plurality of versions of the second image, wherein each respective priority map identifies a plurality of high-priority regions in a corresponding one of the plurality of versions of the second image; and
- rendering a third image based on the priority maps for each of the plurality of versions of the second image, comprising performing a ray-tracing process having a greater number of samples per pixel for the high-priority regions of the third image than for other regions of the third image.

* * * * *

UNITED STATES PATENT AND TRADEMARK OFFICE
CERTIFICATE OF CORRECTION

PATENT NO. : 8,824,834 B2  
APPLICATION NO. : 13/562595  
DATED : September 2, 2014  
INVENTOR(S) : Moon et al.

Page 1 of 1

It is certified that error appears in the above-identified patent and that said Letters Patent is hereby corrected as shown below:

In the Claims

Column 11, Line 53, delete "rending", insert -- rendering --, therefor.

Signed and Sealed this
Thirtieth Day of December, 2014

Michelle K. Lee
*Deputy Director of the United States Patent and Trademark Office*